United States Patent [19]

Saucier

[11] Patent Number: 5,917,902
[45] Date of Patent: Jun. 29, 1999

[54] METHODS AND SYSTEMS FOR DETERMINING THE CLASSIFICATION OF A CALL

[75] Inventor: Jerry B. Saucier, Helena, Ala.

[73] Assignee: BellSouth Corporation, Atlanta, Ga.

[21] Appl. No.: 08/813,488

[22] Filed: Mar. 7, 1997

[51] Int. Cl.⁶ .......................... H04M 3/00; H04M 15/00
[52] U.S. Cl. .................. 379/242; 379/113; 379/114; 379/115; 379/133; 379/201
[58] Field of Search ................... 379/111, 112, 379/113, 114, 115, 133, 201, 207, 242, 245

[56] References Cited

U.S. PATENT DOCUMENTS

| | | | |
|---|---|---|---|
| 5,416,833 | 5/1995 | Harper et al. | 379/201 |
| 5,473,630 | 12/1995 | Penzias et al. | 379/115 X |
| 5,491,742 | 2/1996 | Harper et al. | 379/201 |
| 5,515,425 | 5/1996 | Penzias et al. | 379/115 X |
| 5,583,926 | 12/1996 | Venier et al. | 379/207 |
| 5,724,584 | 3/1998 | Peters et al. | 379/119 X |
| 5,768,358 | 6/1998 | Venier et al. | 379/207 |

*Primary Examiner*—Harry S. Hong
*Attorney, Agent, or Firm*—Jones & Askew

[57] ABSTRACT

Methods and systems to determine whether a directory number is classified as associated with other directory numbers or associated by local calling area. In a first method, a table of patterns is provided. Each pattern includes a terminating NPA-NXX designation that represents a directory number associated with a terminating device that may be dialed as a local call from an originating device having a local calling area pattern corresponding to the pattern to which this terminating NPA-NXX designation belongs. In response to receipt of an NPA-NXX portion, the pattern table is checked for a corresponding pattern and information is provided about the corresponding pattern. This information includes a terminating NPA-NXX designation. A determination may be made from the information as to what directory number may be dialed as a local call from the originating device having the NPA-NXX portion. In a second method, local calling area (LCA) pattern file including a plurality of LCA patterns is provided. Each LCA pattern includes a switch entry having a first part with a switch identifier and a second part with a directory number that is served by the switch and that is part of LCA pattern to which the switch entry belongs. In response to receipt of a directory number, the LCA pattern file is checked for a corresponding LCA pattern. Information is provided with respect to the corresponding LCA pattern.

9 Claims, 6 Drawing Sheets

METHODS AND SYSTEMS FOR DETERMINING THE CLASSIFICATION OF A CALL

FIELD OF THE INVENTION

This invention generally relates to the field of telecommunications, and particularly relates to the field of classification of types of calls as local calls or non-local calls.

BACKGROUND OF THE INVENTION

At one time, the issue of whether a particular telecommunications call is a local call or a non-local call was primarily of interest to only two parties: the subscriber and the telecommunications service provider that billed the subscriber for the call. These two parties remain interested in this issue because a local call may billed differently than a non-local call. For purposes of this application, a local call is defined as a call for which the service provider charges a base fee and no extra fees such as long distance charges, toll charges, etc.

Presently, the issue of whether a particular telecommunications call is a local call is of interest to other parties as well as the subscriber and the service provider. Such other parties may include marketing and sales people who offer products and services that are used in conjunction with telecommunication services. These marketing and sales people may be interested in determining the local calling area of a subscriber in order to better target products and services to that subscriber. As used herein, a local calling area of a subscriber encompasses the geographic area that the subscriber may call with a local call. In other words, a local calling area is generally the area within which local telephone service is furnished to subscribers under a specific schedule of exchange rates and without long distance or other such charges. A local calling are may include one or more exchange service area. As used herein, the term "local calling area" is used synonymously with the following terms unless otherwise noted: local service area, limited local calling area, full local calling area, and expanded local calling area.

Thus, subscribers and telecommunications service providers remain interested in the issue of whether a particular call is a local call or a non-local call. But this interest has expanded to include marketing and sales people. Other parties as well may have their own reasons for taking an interest in a subscriber's local calling area, and in particular, whether a particular call is classified as a local call or non-local call.

Generally, a telecommunications service provider constructs and maintains extensive records to keep track of the classification of a particular call as a local or non-local call. These records are based on the organization of directory numbers that are respectively assigned to subscribers or terminating devices or lines associated with a subscriber. A directory number, commonly referred to as a telephone number, is the number that is dialed or input by a calling party or an originating device to place a call to a terminating device associated with the dialed directory number. The dialed directory number provides information with respect to the routing of the communication from the originating device to the terminating device. Each directory number in the North American Numbering Plan Area includes ten digits (e.g. 404-818-3720). A group of 10,000 directory numbers having the same first six digits is referred to as an "NPA-NXX". The "NPA" of "NPA-NXX" generally refers to "Numbering Plan Area" and the "NXX" generally refers to "Exchange". For example, there are 10,000 ten-digit directory numbers that start with an NPA-NXX of 404-818. Thus, the NPA-NXX of 404-818 represents these 10,000 directory numbers. Of course, not all of these directory numbers may be assigned to subscribers. The first six digits of a ten digit directory number are also referred to herein as the NPA-NXX portion of the directory number or as the NPA-NXX designation or part of the directory number.

Generally, all of the lines that are associated with directory numbers that have a common NPA-NXX are served by the same switch in a telecommunications network. An exception to this generalization is discussed below after this general explanation. Reference again is made to the generalization that directory numbers having a common NPA-NXX are served by the same switch in a telecommunications network. For example, all of the lines that are associated with directory numbers that have an NPA-NXX of 404-818 are served by the same switch. Further, this switch may serve lines that are associated with other NPA-NXXs. For example, the switch serving the 404-818 lines also may serve lines with the following NPA-NXXs: 404-515, 404-656, and 404-749. Thus, when a calling party places a telephone call, the first six digits of the dialed directory number (i.e., the NPA-NXX portion) identify the switch that serves the line associated with the desired subscriber or terminating device. As used herein, the term "switch" may also include a central office or end office. In an Advanced Intelligent Network (AIN), a switch also may be referred to as a service switching point (SSP). When a call originates on a line served by a switch, then the switch may be referred to as an originating switch. The NPA-NXX portion of the directory number associated with the line or device from which the call originates may be referred to as an originating NPA-NXX. Of course, the device from which the call originates may be referred to as the originating device. Similarly, when a call terminates on a line served by a switch, the switch may be referred to as a terminating switch. The NPA-NXX of the directory number associated with the line or device to which the call is directed may be referred to as the terminating NPA-NXX. Of course, the device to which the call is directed and to which the call terminates may be referred to as the terminating device.

An exception was noted to the generalization that all of the lines that are associated with directory numbers that have a common NPA-NXX are served by the same switch in a telecommunications network. The noted exception to this generalization is the case of "split-offices". A split-office may also be referred to as a "split-switch." For example, in a large local calling area that crosses state borders such as in Chattanooga, Tenn. or Columbus, Ga., two or more switches may serve the same NPA-NXX. In particular, switch A may serve a first group of directory numbers having a certain NPA-NXX and switch B may serve a second group of directory numbers having the same NPA-NXX as that of the first group served by switch A. Thus, service of this certain NPA-NXX is split between switch A and switch B. The existence of these split-offices aggravates the problem of determining the local calling area of any particular directory number or NPA-NXX. This problem is aggravated by the existence of split-offices because, inter alia, a local calling area for a particular NPA-NXX may not be determined by reliance on the area served by the switch that serves the particular NPA-NXX.

Principally for billing purposes, a telecommunications service provider must be able to determine whether a call from a device associated with a specific NPA-NXX is a local call or a non-local call. If the call is a local call, the service provider bills the subscriber at a predetermined rate for the call. If the call is a non-local call, then the service provider may bill the subscriber at a different rate for the call. A service provider generally makes this determination of whether a call is a local call or a non-local call by consulting a table known to those skilled in the art as a Combo file or table or an Originating NPA-NXX/Terminating NPA-NXX file or table. This Combo file is constructed and maintained to accommodate this requirement of determining whether a call from a device assigned a specific NPA-NXX as part of its directory number is a local call or a non-local call. A typical Combo file includes millions of entries. Each entry in the Combo file usually includes at least two parts: (1) an originating NPA-NXX; and (2) a terminating NPA-NXX. By these parts, each entry represents a call that may be made as a local call from a device associated with a directory number having the originating NPA-NXX to another device associated with a directory number having the terminating NPA-NXX. For ease of explanation, this description refers to "a call from an originating NPA-NXX" as short-hand for "a call from an originating device associated with a directory number including the originating NPA-NXX". this description also refers to "a call to a terminating NPA-NXX" as short-hand for "a call to a terminating device associated with a directory number in the terminating NPA-NXX".

It is important to note that a Combo file typically includes information in addition to originating and terminating NPA-NXX. Such as band information or expanded billing information. This additional information has not been described in this specification for sake of simplicity and clarity of explanation.

More particularly explained, each of the entries in the Combo file is constructed in two parts. First, an originating NPA-NXX is entered as an NPA-NXX associated with a specific directory number used in the geographic area served by the service provider. Second, a terminating NPA-NXX is entered as an NPA-NXX associated with directory numbers used in the geographic area served by the service provider and to which a call from the originating NPA-NXX is deemed to be a local call. From these two-part entries in the Combo file, a call from a particular device may be classified as a local call or a non-local call. For example, assume that a call is made from a device associated with a directory number having a specific NPA-NXX, which is referred to as the originating NPA-NXX. This call is made to another device associated with another directory number having another NPA-NXX, which is referred to as the terminating NPA-NXX. To classify this call as a local call, the Combo file is checked to determine whether there is an entry that corresponds to the originating NPA-NXX and terminating NPA-NXX associated with the call. In particular, each of the entries in the Combo file must be checked to determine whether there is such a matching entry. As noted above, a typical Combo file includes millions of entries. Thus, to classify a call as a local call, these millions of entries must be checked against the originating NPA-NXX and terminating NPA-NXX of the call. If a matching entry is found amongst the millions of entries, then the call is classified as a local call. Otherwise, if no matching entry is found, then the call cannot be classified as a local call. Other steps may have to be taken with respect to the classification of this call.

As noted, a telecommunications service provider constructs this Combo file to keep track of calls that may be classified as local calls versus non-local calls. Even though this Combo file keeps track of the classification of calls between originating NPA-NXXs and terminating NPA-NXXs, this Combo file includes millions of entries. These millions of entries cause significant problems with respect to the storage and use of this Combo file. With so many entries, this Combo file occupies a lot of memory space in the device storing this Combo file. Thus, this Combo file may not be readily stored on devices that have limited storage space. As such a large occupier of memory, this Combo file may not be readily transferred to other devices. Also with so many entries, this Combo file is difficult to search. As noted above, to classify a call as a local call, the Combo file is checked to determine whether there is an entry that corresponds to the originating NPA-NXX and terminating NPA-NXX associated with the call. With millions of entries to check, a check for a matching entry may take a relatively long time. The length of time used in searching the Combo file may be unacceptable for several reasons.

These enumerated problems with the Combo file have plagued the telecommunications service providers which use such Combo files. But with the increased interest from others such as marketing and sales people in the issue of the classification of calls from subscribers as local or non-local calls, these problems with the Combo files are exacerbated. Generally, these interested parties such as marketing and sales people do not have the same types of large scale computing devices or facilities as used by telecommunications services providers. Thus, these interested parties suffer further from the problems of Combo files occupying large amounts of memory, being non-readily transferable, and being slow to search. These problems frustrate these interested parties in quickly and readily obtaining information about the local calling area of a particular NPA-NXX or other information that may be gleaned from a Combo file.

In sum, the issue of whether a particular call made or that may be made by a subscriber is a local call or a non-local call is of increasing interest to parties other than just subscribers and telecommunications service providers. The Combo files used to classify a call as a local or non-local call based on the originating NPA-NXX and terminating NPA-NXX associated with the call have proved inadequate in certain respects for use by these other parties and by telecommunications service providers. The large sizes of these files and tables have made them difficult to store, to transfer and to search in a quick and efficient manner.

Therefore, there is a need for an improved method and system for determining the classification of a call as a local call or a non-local call.

There is a particular need for a method and system for determining the classification of a call as a local call or a non-local call based on the originating NPA-NXX associated with a call.

There is also a particular need for a method and system for obtaining local calling area information based on a particular NPA-NXX of a directory number.

There is yet another particular need for a method and system for obtaining information regarding calls that are classified as local calls from a particular NPA-NXX.

There is a further need for a method and system for determining the classification of a call as a local or non-local call and the local calling areas of any particular NPA-NXX that may be used in connection with general purpose computing devices such as personal computers, without occupying large amounts of memory of such devices, by being readily transferable between such devices, and by being readily searched by such devices.

SUMMARY OF THE INVENTION

The present invention solves the problems of the prior art by providing methods and systems for determining whether a directory number or portion of a directory number, such as the NPA-NXX, is classified as associated with another or other directory numbers, or with portions of another or other directory numbers, such as the NPA-NXX of another or the NPA-NXXs of other directory numbers. This classification or association may be based on a relationship between the directory numbers such that a call from one of the directory numbers to another of the directory numbers is categorized as a local call rather than a non-local call. Advantageously, the present invention quickly, efficiently and accurately provides information with respect to the classification of a directory number or portion thereof and with respect to the other directory numbers that may be dialed as local calls. This information may be very useful in many fields associated with telecommunications including sales and service.

Stated generally, an exemplary method of the present invention may be used to determine whether a directory number is classified as associated with other directory numbers. This method includes the provision of a local calling area (LCA) pattern file that includes a plurality of LCA patterns. Each LCA pattern includes a switch entry having a first part and a second part. The first part includes a switch identifier identifying a switch. The second part represents at least one directory number that is served by the switch and that is part of LCA pattern to which the switch entry belongs. This exemplary method also includes the step of receiving a particular directory number, and checking the LCA pattern file for the LCA pattern corresponding to this particular directory number. Preferably, the LCA pattern corresponding to the particular directory number represents the local calling area for the particular directory number. Then, information is provided with respect to the LCA pattern corresponding to the particular directory number. Preferably, this step includes providing the information with respect to the local calling area for the particular directory number. Further, this information generally includes at least one switch entry having a first part including a switch identifier and having a second part. Thus, a determination may be made from this information as to whether the directory number is classified as associated with other directory numbers.

Another embodiment of the present invention provides a computer-readable medium on which is stored a computer program for determining whether a directory number is classified as associated with other directory numbers. This computer program includes instructions, which when executed by a computer, perform the steps of the exemplary method described in the immediately preceding paragraph (except those steps or elements that are noted in connection with a preferred embodiment).

Still stated generally, another exemplary embodiment of the present invention provides a method that determines what directory number may be dialed as a local call from an originating device associated with a directory number having a particular NPA-NXX portion. This exemplary method includes the step of providing a local calling area (LCA) pattern file that includes a plurality of LCA patterns. Each LCA pattern includes at least one switch entry with each switch entry having two parts. These parts include: (1) a switch identifier identifying a switch; and (2) either a wildcard code or a terminating NPA-NXX designation. The wildcard code serves as an indicator that all directory numbers having NPA-NXX portions served by the identified switch are included as terminating directory numbers in the LCA pattern corresponding to the particular NPA-NXX portion. On the other hand, the terminating NPA-NXX designation represents a terminating directory number associated with a terminating device that may be dialed as a local call from an originating device associated with an originating directory number having a particular NPA-NXX portion;

This exemplary method also includes the step of receiving a particular NPA-NXX portion representing one or more directory numbers, and checking the LCA pattern file for the LCA pattern corresponding to this particular NPA-NXX portion. Preferably, the LCA pattern corresponding to the particular NPA-NXX portion represents the local calling area for the particular NPA-NXX portion. Then, information is provided with respect to the LCA pattern corresponding to the particular NPA-NXX portion. Preferably, this step includes providing this information with respect to the local calling area for the particular NPA-NXX portion. Further, this information generally includes at least one switch entry with a switch identifier and either a wildcard code or a terminating NPA-NXX designation Thus, a determination may be made from this information as to what other directory number may be dialed as a local call from the originating device associated with the directory number having the particular NPA-NXX portion.

Another embodiment of the present invention provides a computer-readable medium on which is stored a computer program for determining what directory number may be dialed as a local call from an originating device associated with a directory number having a particular NPA-NXX portion. This computer program includes instructions, which when executed by a computer, perform the steps of described in the immediately preceding two paragraphs (except those steps or elements that are noted in connection with a preferred embodiment).

Yet still generally stated, another exemplary embodiment of the the present invention provides a method for determining what directory number may be dialed as a local call from an originating device associated with an originating directory number having a particular NPA-NXX portion. This method provides a pattern table that includes a plurality of patterns. Each pattern of the plurality of patterns includes a plurality of terminating NPA-NXX designations. Each terminating NPA-NXX designation represents a directory number associated with a terminating device that may be dialed as a local call from an originating device having a local calling area pattern corresponding to the pattern to which this terminating NPA-NXX designation belongs.

This method further provides for receiving a particular NPA-NXX portion, and for checking the pattern table for the pattern corresponding to the particular NPA-NXX portion. Information then is provided with respect to the pattern corresponding to the particular NPA-NXX portion. This information includes at least one of the plurality of terminating NPA-NXX designations. Thus, a determination may be made from the provided information as to what other directory number may be dialed as a local call from the originating device associated with the originating directory number having the particular NPA-NXX portion.

Therefore, it is an object of the present invention to provide an improved method and system for determining the classification of a call as a local call or a non-local call.

It is also an object of the present invention to provide a method and system for determining the classification of a call as a local call or a non-local call based on the originating NPA-NXX associated with a call.

It is further an object of the present invention to provide a method and system for obtaining local calling area information based on a particular NPA-NXX of a directory number.

In addition, it is an object of the present invention to provide a method and system for obtaining information regarding calls that are classified as local calls from a particular NPA-NXX.

It is another object of the present invention to provide a method and system for determining the classification of a call as a local or non-local call and the local calling areas of any particular NPA-NXX that may be used in connection with general purpose computing devices such as personal computers, without occupying large amounts of memory of such devices, by being readily transferable between such devices, and by being readily searched by such devices.

That the present invention and the exemplary embodiments thereof overcome the problems and drawbacks set forth above and accomplish the objects of the invention set forth herein will become apparent from the detailed description of exemplary embodiments which follows.

DETAILED DESCRIPTION

Figure 1:
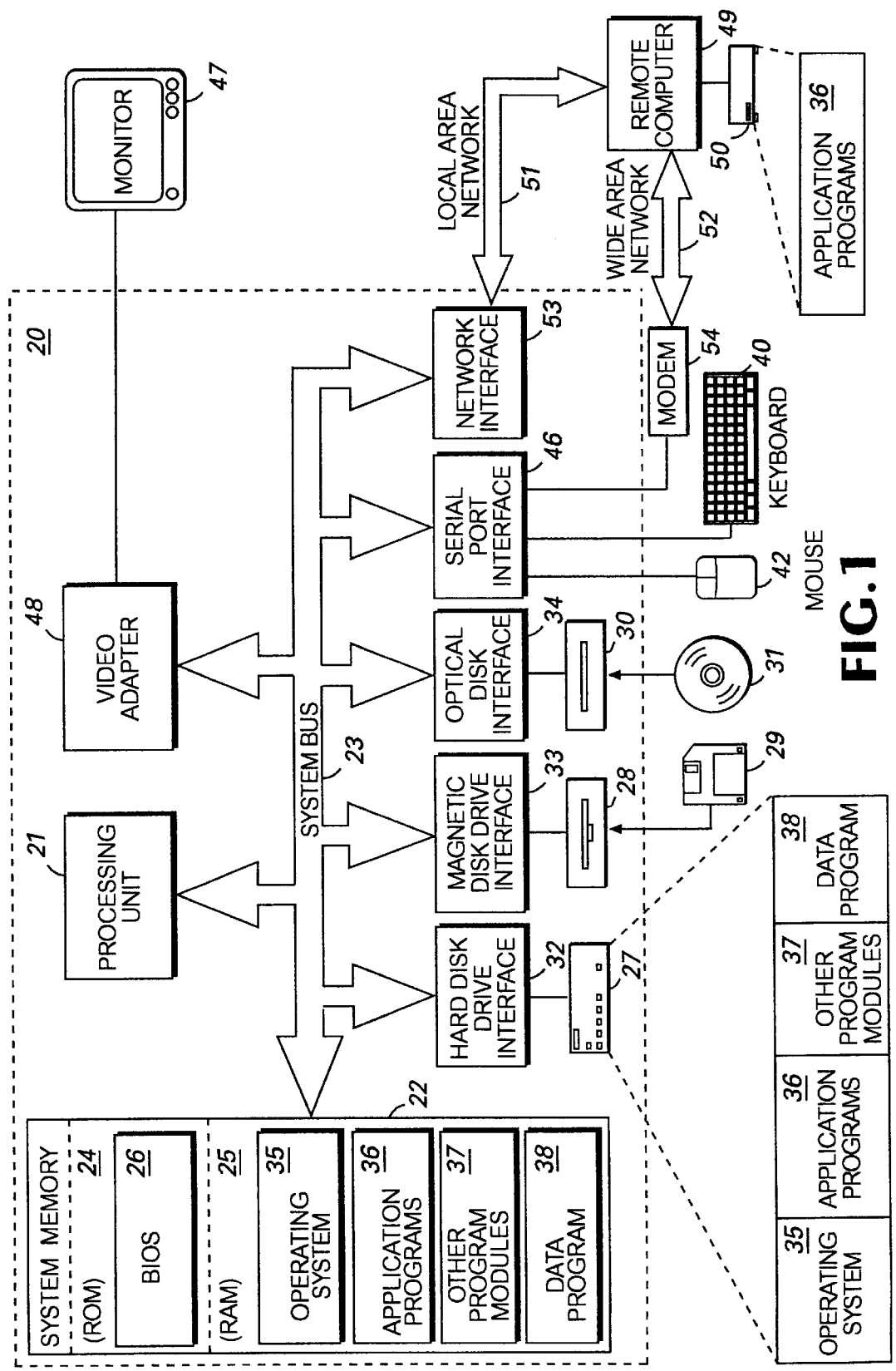
FIG. 1 is an illustration of a personal computer suitable for use in implementing the present invention.

This detailed description first provides a general overview of the exemplary embodiments of the present invention. Then, in connection with FIG. 1, a general description is provided of a computer and associated devices such as may be suitable for use in implementing the present invention. Further, in connection with the flow chart of FIG. 2, a more particular description of the exemplary embodiments is provided. This more particular description is illustrated with examples as provided in the displays of FIG. 3 and tables of FIG. 4. The steps involved in the construction of the exemplary tables of FIG. 4 are more fully explained through the use of the flow charts in FIGS. 5 and 6. Finally, an exemplary embodiment is even more particularly explained in connection with the tables of FIG. 7. Throughout the drawings, like numerals indicate like elements and steps.

General overview of the exemplary embodiments of the present invention

Generally stated, the present invention is directed to methods and systems for determining the classification of a call from an originating device having an originating directory number including a particular NPA-NXX. The present invention is further directed to methods and systems for determining whether a directory number or portion of a directory number, such as the NPA-NXX, is classified as associated with another or other directory numbers, or with portions of another or other directory numbers, such as the NPA-NXX of another or the NPA-NXXs of other directory numbers. Among these methods and systems, the present invention provides an exemplary method and system for determining what directory number may be dialed as a local call from an originating device associated with a directory number having a particular NPA-NXX portion. In other words, this exemplary embodiment provides information with respect to the local calling area of directory numbers having a common particular NPA-NXX portion.

For example, assume that a salesperson is interested in finding out the extent of the local calling area of a subscriber having a directory number of 404-818-3720 associated with the subscriber's device. A local calling area may also be referred to herein synonymously with the term "calling pattern", unless otherwise noted. As those skilled in the art readily recognize, the NPA-NXX portion of this directory number is 404-818. Pursuant to an exemplary method of the present invention, the salesperson may obtain information with respect to the calling pattern for 404-818 including the other NPA-NXXs that may be dialed from the subscriber's device as part of a local call. Pursuant to another exemplary method of the present invention, the salesperson may obtain switch information with respect to the calling pattern for 404-818. In the preferred embodiment, the salesperson may obtain this switch information by providing the NPA-NXX (i.e., 404-818), or if the salesperson knows the switch serving this NPA-NXX, then by providing the Common Language Location Identification (CLLI) code for the switch. Advantageously, the present invention quickly, efficiently and accurately provides information with respect to the classification of a directory number or portion thereof as associated with other directory numbers or portions thereof. This information may be very useful in many fields associated with telecommunications including sales and service.

A general description of an exemplary operating environment

FIG. 1 and the following discussion are intended to provide a brief, general description of a suitable computing environment in which the present invention may be implemented. Although the present invention is described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

More particular descriptions of the exemplary embodiments of the present invention As generally stated above, the present invention is directed to methods and systems for determining whether a directory number or portion of a directory number, such as the NPA-NXX, is classified as associated with another or other directory numbers, or with portions of another or other directory numbers, such as the NPA-NXX of another or the NPA-NXXs of other directory numbers. As also stated above, these methods and systems may be provided in the context of an application program such as may be used in connection with the exemplary operating environment described above. The methods and systems of the present invention preferably are constructed and operate in connection with certain tables of information including a Combo file, a pattern table, and an LCA pattern file. Although the terms "table" and "file" used herein, those skilled in the art will understand these terms to include other systems and methods for compilations of information such as databases, charts, listings, etc. Further, these tables may include additional information to that information described herein.

Figure 2:
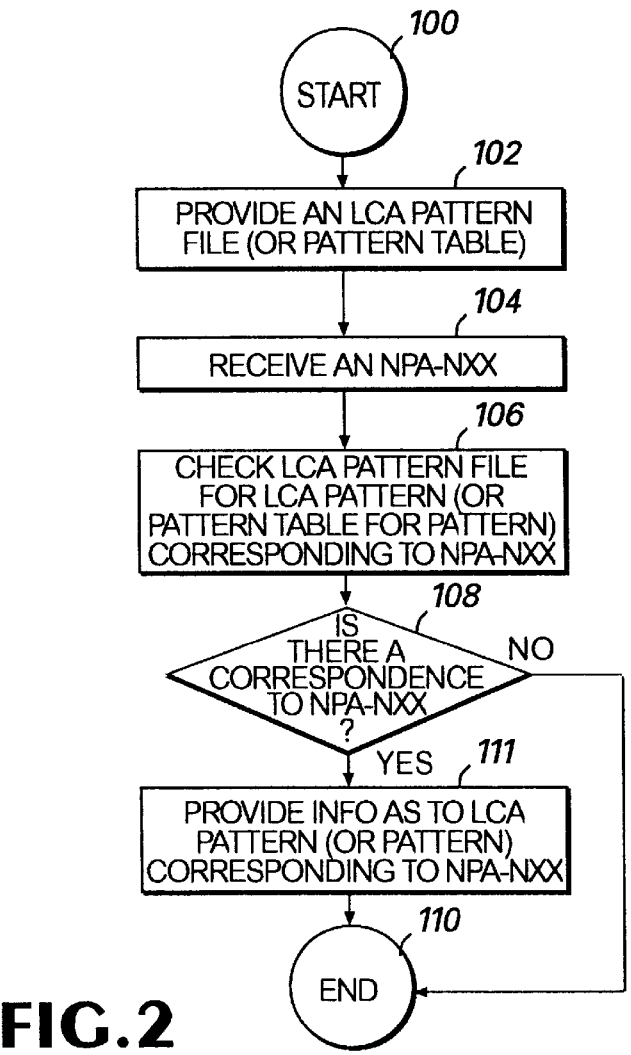
FIG. 2 is a flow chart illustrating a general method of an exemplary embodiment of the present invention.

A high level description of exemplary methods and systems of the present invention is provided with reference to the flow chart of FIG. 2. FIG. 2 is entered at start step 100 and the method proceeds to step 102 wherein an LCA pattern file is provided. Alternatively, a pattern table may be provided. Further details regarding the construction and use of a preferred LCA pattern file and pattern table are discussed below in connection with FIG. 4. But for the present, suffice it to say that an LCA pattern file includes a plurality of LCA patterns. An LCA pattern may be understood to represent a local calling area or calling pattern with respect of one or more directory numbers having a common NPA-NXX or common NPA-NXXs. Each LCA pattern includes a switch entry. Of course, an LCA pattern may include and generally does include more than one switch entry. A switch entry generally includes two parts. The first part of a switch entry typically includes a switch identifier that identifies a switch associated with the LCA pattern to which the switch entry belongs. The second part of a switch entry typically includes or represents at least one directory number that is served by the switch and that is part of the LCA pattern. This representation in the second part of a switch entry may take the form of a wildcard code or a terminating NPA-NXX designation.

With respect to the representation in the second part of a switch entry, the wildcard code is more inclusive with respect to NPA-NXXs that are included as part of the LCA pattern while the terminating NPA-NXX designation is less inclusive. When the representation includes a wildcard code, the wildcard code in the switch entry typically indicates that all directory numbers having NPA-NXX portions served by the switch identified by the switch identifier are included as terminating directory numbers in the LCA pattern corresponding to a particular NPA-NXX portion of a directory number. This indication that "all" directory numbers having NPA-NXX portions served by the identified switch earns this form of representation the "wildcard" appellation. For example, a wildcard code associated with switch A in a switch entry indicates that all directory numbers served by switch A are part of the LCA pattern corresponding to a directory number having a particular NPA-NXX portion.

On the other hand, as noted, the representation in the second part of a switch entry may include a terminating NPA-NXX designation. The terminating NPA-NXX designation typically represents that only directory numbers having the terminating NPA-NXX designation in common and served by the switch identified by the switch identifier may be dialed as a local call from an originating device associated with an originating directory number having a particular NPA-NXX portion. This indication that "only directory numbers having the terminating NPA-NXX designation in common" served by the identified switch demonstrates that this form of representation is less inclusive than the "wildcard" representation. For example, a terminating NPA-NXX designation associated with switch B in a switch entry indicates that only directory numbers having the terminating NPA-NXX designation in common and served by switch B are part of the LCA pattern corresponding to a directory number having a particular NPA-NXX portion. Generally, a terminating NPA-NXX designation is used in the preferred embodiment of the present invention to handle cases of split-offices.

On the other hand, a pattern table includes a plurality of patterns. Each pattern preferably includes a plurality of patterns. Each pattern preferably includes a plurality of terminating NPA-NXX designations. Each terminating NPA-NXX designation represents a directory number associated with a terminating device that may be dialed as a local call from an originating device having a local calling area corresponding to the pattern including the terminating NPA-NXX designation.

Referring again to FIG. 2, in step 104 a particular NPA-NXX is received. This particular NPA-NXX may be directly input by a user or this particular NPA-NXX may be gleaned or determined from the input of a directory number by the user. For example, a user may input a directory number through use of a computer. The receipt of this directory number preferably indicates that information regarding this directory number, and in particular, the NPA-NXX of this directory number is sought. Alternatively, other information may be input by the user and the NPA-NXX may be gleaned from such other information. Such other information may include a switch identification such as the CLLI code for the switch serving the directory number. Other information may also include the name of the subscriber, address or other information associated with a directory number and/or the NPA-NXX of the directory number. Reference in this description to an NPA-NXX will be understood to include these alternatives to an NPA-NXX from which an NPA-NXX may be gleaned or otherwise determined and other alternatives as will occur to those skilled in the art.

Referring still to FIG. 2, upon receipt of the NPA-NXX, in step 106 the LCA pattern file is checked for an LCA pattern corresponding to the received NPA-NXX. Alternatively, the pattern table is checked for a pattern corresponding to the received NPA-NXX. If the check step 108 results in a negative determination, then the method ends in step 110. Generally, a negative determination means that information is unavailable regarding this particular NPA-NXX. Optionally, as a result of the negative determination, the preferred method may provide the user with alternatives with respect to continuing the method, inputting a different NPA-NXX, etc. If the check step 108 results in a positive determination, then in step 111 the exemplary method provides information with respect to the LCA pattern or pattern corresponding to the particular NPA-NXX. With respect to an LCA pattern, information may include at least one switch entry with the switch entry including a switch identifier and either a wildcard code or a terminating NPA-NXX designation. Alternatively, with respect to a pattern, this information may include one or more terminating NPA-NXX. From this information, a determination may be made as to what other directory number may be dialed as a local call from the originating device associated with the directory number having the particular NPA-NXX portion. In use with an application program, this information may be made available for display on a computer monitor and/or a graphical user interface for review by a user. If no optional steps are taken, then this method ends after step 111 in step 110.

Figure 3:
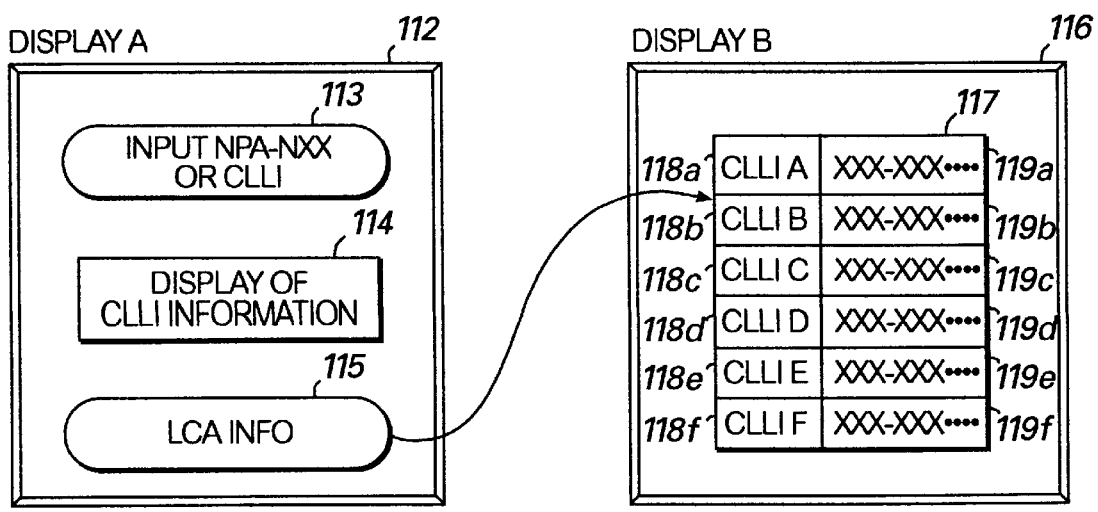
FIG. 3 includes two screen displays such as may be used in the implementation of an exemplary embodiment of the present invention.
Figure 4:
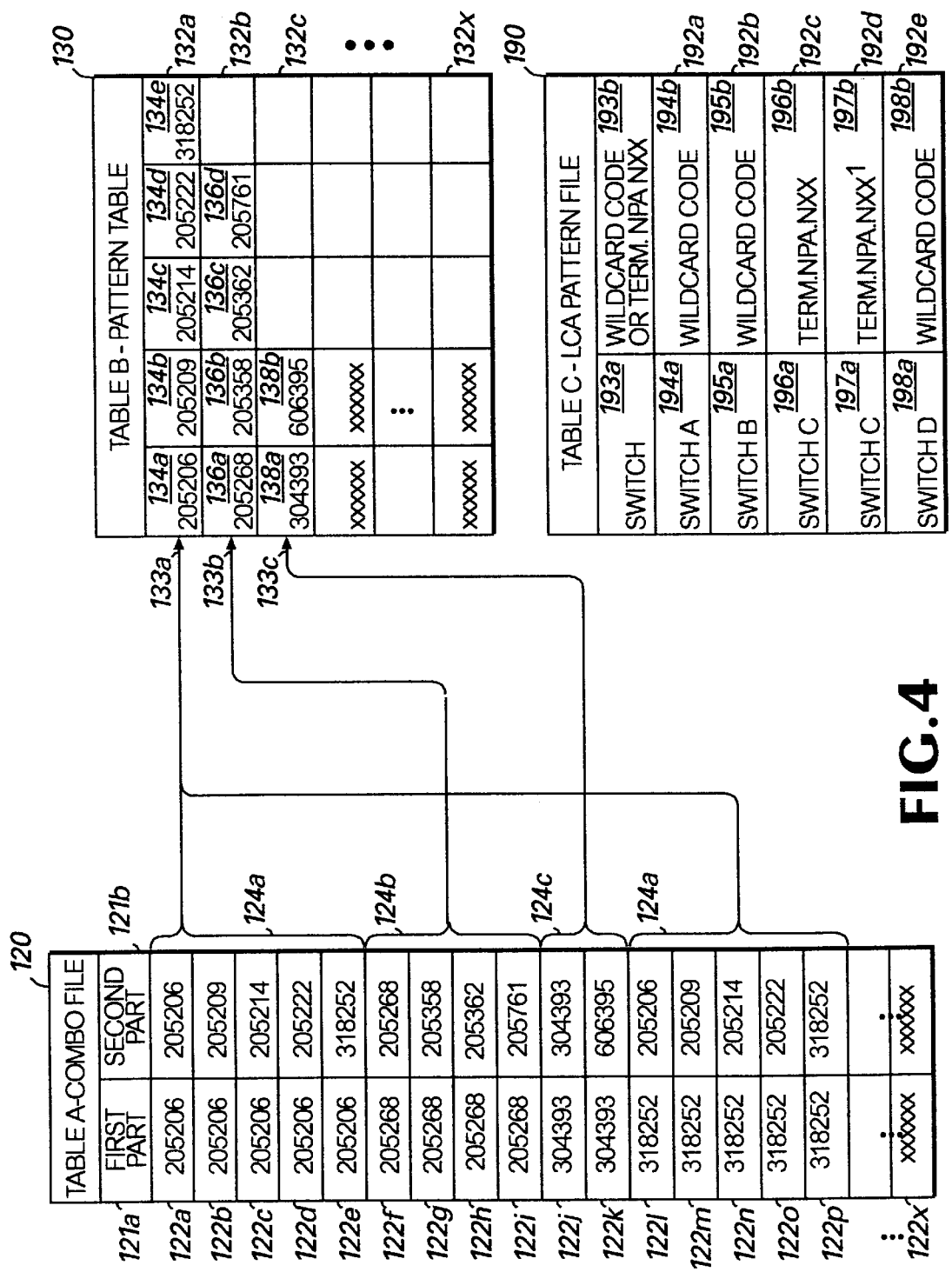
FIG. 4 includes three tables (Tables A, B and C) such as may be used in the construction and implementation of an exemplary embodiment of the present invention.

FIG. 3 includes two computer screen displays (Display A and Display 3) such as may be used in the implementation of an exemplary embodiment of the present invention. These screen displays are representational only, and in use, may contain additional information and/or graphics. Such screen displays may be used to facilitate an exchange of information between an application program and a user, or simply to display information to a user. Referring to Display A 122, and in particular to element 113 labeled as "Input NPA-NXX or CLLI", an NPA-NXX (Step 104 of FIG. 2) may be input and/or displayed on the Display A. The NPA-NXX may be displayed by itself or in connection with other information such as a CLLI code associated with the NPA-NXX, etc. The Display A 112 also may include a display of CLLI information 114 such as the name of the switch or wire center, its address, its vertical and horizontal (V&H) coordinates, etc. Further, the Display A 112 may include a hot button such as the element 115 labeled as "LCA Info". In the preferred embodiment, this hot button is provided to enable the user to quickly and efficiently obtain local calling area information about a particular NPA-NXX, and specifically, about the particular NPA-NXX that is input and/or displayed in element 113 of Display A 112.

Still referring to FIG. 3, in the preferred embodiment of the present invention, the hot button 115 labeled "LCA Info" may be activated by a user. Upon activation, another screen display (Display B) 116 is presented to the user. This Display B 216 includes information 117 with respect to the LCA pattern or pattern corresponding to the particular NPA-NXX as input and/or displayed on element 113 of Display A 112. As illustrated on Display B 116, this information 117 includes a plurality of switch entries with each switch entry including a first part 118a–118f and each switch entry including a second part 119a–119f. As illustrated, each of the first parts 118a–118f includes a reference to a particular switch. Also as illustrated, each of the second parts 119a–119f includes a wildcard code. Of course, one or more of these second parts 119a–119f may include a terminating NPA-NXX designation rather than a wildcard code. From this displayed information 117, the user may make a determination as to what other directory number may be dialed as a local call from the originating device associated with the directory number having the particular NPA-NXX portion as input and/or displayed on element 113 of Display A 112. Of course, it may be impossible to display all of the information 117 with respect to a particular LCA pattern on a screen display such as Display B 113. Thus, the user may have to scroll through or otherwise bring up the other information as appropriate.

In sum, the general steps of the exemplary methods and systems provide an LCA pattern file or pattern table, receive a particular NPA-NXX, and check the LCA pattern file for an LCA pattern or pattern table for a pattern corresponding to the received particular NPA-NXX. If there is an LCA pattern or pattern corresponding to the received particular NPA-NXX, then information regarding this LCA pattern or patterns is provided. Further details regarding these exemplary methods and systems are now provided through the use of illustrative examples and the tables illustrated in FIG. 4.

Description of the files and/or tables that may be used in the exemplary embodiments As explained generally above, the methods and systems of the present invention preferably are constructed and operate in connection with certain files or tables of information including a Combo file, a pattern table and an LCA pattern file. Advantageously, these files and tables allow for quick, efficient and accurate methods and systems for determining whether a directory number or portion of a directory number, such as the NPA-NXX, is classified as associated with another or other directory numbers, or with portions of another or other directory numbers, such as the NPA-NXX of another or the NPA-NXXs of other directory numbers. The general steps for construction of these files and tables are provided below in the exemplary context of a method for determining what directory number may be dialed as a local call from an originating device associated with an originating directory number having a particular NPA-NXX. Those skilled in the art will understand that similar files and tables may be constructed pursuant to the described steps for use in connection with the present invention, and such files and tables may based on other information and on other methods and systems.

Description of a Combo file

In exemplary embodiment of the present invention, an LCA pattern file and a pattern table are provided. The pattern table preferably is constructed from a Combo file. The exemplary LCA pattern file preferably is constructed from a Combo file and from a pattern table. An explanation of a typical Combo file is provided above in a description of the background of this invention. The pertinent details of a typical Combo file are reviewed here to provide context for a description of an exemplary embodiment of the present invention. After the description of a typical Combo file, the construction of a typical pattern table is described. Then, the construction of an LCA pattern file as based on a typical pattern table is described.

As illustrated in FIG. 4, Table A illustrates an exemplary Combo file 120 with sample entries 122a–122x, which will be useful in the description of the present invention. A Combo file is generally constructed and maintained to aid in the determination of whether a call from an originating device associated with a specific NPA-NXX as part of its directory number is a local call. Each entry in the Combo file usually includes at least two parts: (1) first part 121a—an originating NPA-NXX; and (2) second part 121b—a terminating NPA-NXX. By these parts, each entry represents a call that may be made as a local call from an originating NPA-NXX to a terminating NPA-NXX.

As noted, each entry 122a–122x of a typical Combo file 120 represents a call that may be made as a local call from an originating NPA-NXX to a terminating NPA-NXX. Generally, an originating NPA-NXX may make local calls to more than one terminating NPA-NXX. Thus, the Combo file 120 includes an entry for each terminating NPA-NXX that may be reached through a local call from an originating NPA-NXX. For example, assume that a local call may be made from an originating NPA-NXX to five different terminating NPA-NXXs. Then, the Combo file 120 includes five entries for the originating NPA-NXX. Each of these entries has a common first part, i.e., the originating NPA-NXX. But each of these entries has a respectively different second part, i.e., one of the five different terminating NPA-NXXs. Referring to Table A, entries 122a–122e represent entries with a common originating NPA-NXX, but with five different terminating NPA-NXXs. From these entries 122a–122e, it may be deduced that a call from the originating NPA-NXX to any of the five terminating NPA-NXXs may be made as a local call. A typical Combo file includes millions of entries. The exemplary Combo file 120 includes only a representative sample of entries 122a–122x for simplicity of explanation.

Description of a pattern table

A general description of the construction of a pattern table 130 is now provided in connection with Table B of FIG. 4. After this general description, a more detailed description of the construction of an pattern table 130 is provided in connection with the flow chart of FIG. 5.

Generally stated, pursuant to an exemplary embodiment of the present invention, to construct a pattern table, the entries 122a–122x in the Combo file 120 are analyzed for a pattern(s) that the respective first parts and second parts of the entries may indicate. Preferably, the Combo file is analyzed for a calling pattern(s) that the entries may indicate. A pattern is determined from the entries 122a–122x based generally on a three-step analysis. As a first step in the analysis, the entries 122a–122x are grouped such that each group includes only entries having a common first part. For example, the entries 122a–122x may be grouped such that each group includes a common originating NPA-NXX. Further, these groups are preferably arranged in ascending numerical order and the entries within each group are preferably arranged in ascending numerical order. In other words, the first entry in the Combo file typically is numerically less than the last entry in the Combo file.

The second step in the three-step analysis of pattern determination from the Combo file is concerned with the second parts of a particular group. Specifically, with respect to each group, the second parts of all of the entries in a group are listed or otherwise associated with each other. In this second step, the terminating NPA-NXXs that may be reached from the common originating NPA-NXX through a local call are listed or otherwise associated with the other terminating NPA-NXXs of the other entries in that group.

The third step in the three-step analysis of pattern determination from the Combo file is also concerned with the second parts of a particular group. Specifically, the particular listing of second parts or designations of a group are compared for identity with other listings of second parts or designations for other groups. If there is no identity, then this particular listing constitutes a pattern. If there is an identity of this particular listing with another listing of second parts or designations of another group, then this identity indicates that a pattern has been duplicated. In other words, if there is an identity of this particular listing of terminating NPA-NXXs with another listing of terminating NPA-NXXs of another group, then the originating NPA-NXX of this particular listing has the same pattern as the originating NPA-NXX of the other group.

By way of further explanation of a calling pattern, with respect to each group, the terminating NPA-NXXs that may be reached as local calls from a common originating NPA-NXX constitute the calling pattern of that common originating NPA-NXX and hence, of the directory numbers represented by that common originating NPA-NXX. Preferably, a common originating NPA-NXX is associated with only one calling pattern of the plurality of calling patterns in the calling pattern table. Such a common originating NPA-NXX is not associated as an originating NPA-NXX with another calling pattern of that calling pattern table. Of course, the NPA-NXX of this common originating NPA-NXX may be included as a terminating NPA-NXX in calling patterns of the calling pattern table. At a minimum, a calling pattern will include at least one terminating NPA-NXX, but there may be no maximum to the number of terminating NPA-NXXs that constitute a calling pattern. If a particular service area has a very limited local calling area, then a calling pattern(s) of that service area may have a corresponding limited number of terminating NPA-NXXs as elements of the pattern(s). On the other hand, if a particular service area has a very large local calling area, then the calling pattern(s) of that service area may have a corresponding large number of terminating NPA-NXXs as elements of the pattern(s). Of course, the calling patterns from service area to service area may vary. Within a particular service area, some calling patterns may include one or very few terminating NPA-NXXs as elements of the patterns and other calling patterns of that same service area may include a greater number of terminating NPA-NXXs as elements of the patterns.

To further explain a calling pattern as used in exemplary embodiments of the present invention, reference again is made to Table A in FIG. 4. In this table 120, there are three different calling patterns 124a–124c as indicated by the entries 122a–122x. The first calling pattern 124a relates to the group of entries 122a–122e that have the first part of 205-206 in common as the originating NPA-NXX. The calling pattern 124a for this group of entries 122a–122e includes the five different terminating NPA-NXXs that may be reached with a local call from the directory number having an NPA-NXX of 205-206. This first calling pattern 124a is as follows:

| Calling Pattern I | 205–206, 205–209, 205–214, 205–222 and 318–252 |

The second calling pattern 124b relates to the group of entries 122f–122i that have a first part of 205-268 in common as the originating NPA-NXX. The calling pattern 124b for this group of entries 122f–122i includes the four different terminating NPA-NXXs that may be reached with a local call from the directory number having an NPA-NXX of 205-268. This second calling pattern 124b is as follows:

| Calling Pattern II | 205–268, 205–358, 205–362, and 205–761 |

The third calling pattern 124c relates only to two entries 122j–122k. The calling pattern 124c includes only the terminating NPA-NXXs that may be reached with a local call from the directory number having an NPA-NXX of 304-393. This third calling pattern 124c is as follows:

| Calling Pattern III | 304–393 and 606–395 |

The careful reader will have noted that we have not referred to entries 122l 14 122p as constituting a fourth calling pattern. These entries have a common first part of an originating NPA-NXX, to-wit: 318-252. But the listing of the terminating NPA-NXXs of this group of entries 122l–122p (205-206, 205-209, 205-214, 205-222 and 318-252) is the same as the listing of the terminating NPA-NXXs of calling pattern I 124a. Thus, the originating NPA-NXXs of 205-206 (entries 122a–122e) and 318-252 (entries 122l 14 122p) have the same calling pattern 124a.

Pursuant to exemplary embodiments of the present invention, the entries in a Combo file 120 are analyzed for calling patterns 124a–124c. These calling patterns 124a–124c then are listed with their constituent elements, i.e., the second parts, or terminating NPA-NXXs of the entries, in a table referred to herein as pattern table 130. Based on the exemplary analysis of calling patterns 124a–124c of the entries 122a–122x in Table A 120, Table B 130 in FIG. 4 illustrates a pattern table with calling patterns 132a–132x. Of these calling patterns 132a–132x, three calling patterns 132a–132c correspond respectively to calling patterns 124a–124c. This correspondence is illustrated respectively by the arrows 133a–133c.

Referring to the pattern table 130 in FIG. 3, each of the rows 132a–132x of this pattern table represents a calling pattern or patterns. This illustrated table 130 includes a row 132a with entries 134a–134e of terminating NPA-NXXs representing the calling pattern 124a, a row 132b with entries 136a–136d of terminating NPA-NXXs representing the calling pattern 124b, and a row 132c with entries 138a–138b of terminating NPA-NXXs representing the calling pattern 124c. Preferably, the row entries in a calling pattern are listed in serial form (rather than random) so as to accommodate the plurality of terminating NPA-NXXs that may be included in any particular pattern. Those skilled in the art will appreciate that the described information in the pattern table 130 may be compiled and/or stored in a different form from that illustrated in FIG. 4 as an example.

Given the distribution of NPA-NXXs at central offices through the service area of a telecommunications service provider, and as noted in the background, a Combo file may include millions of entries. By using the above described calling pattern analysis, these millions of entries may be grouped into a much smaller number of calling patterns and into a pattern table. For a typical service provider with a Combo file having three million entries and having approximately 6,000 NPA-NXXs within the service area, these entries may be grouped into approximately 800–900 calling patterns in a pattern table such as described above in connection with Table B 130.

As explained, the preferred pattern table is created on the basis of entries 122a–122x in a Combo file 120. Those skilled in the art will appreciate that other tables similar to the pattern table may be created pursuant to the description of steps provided above. These similar tables may be based on information other than entries comprised of NPA-NXXs. For example, a table similar to the pattern table may be created on the basis of a list of entries where each entry includes a first part and a second part.

Figure 5:
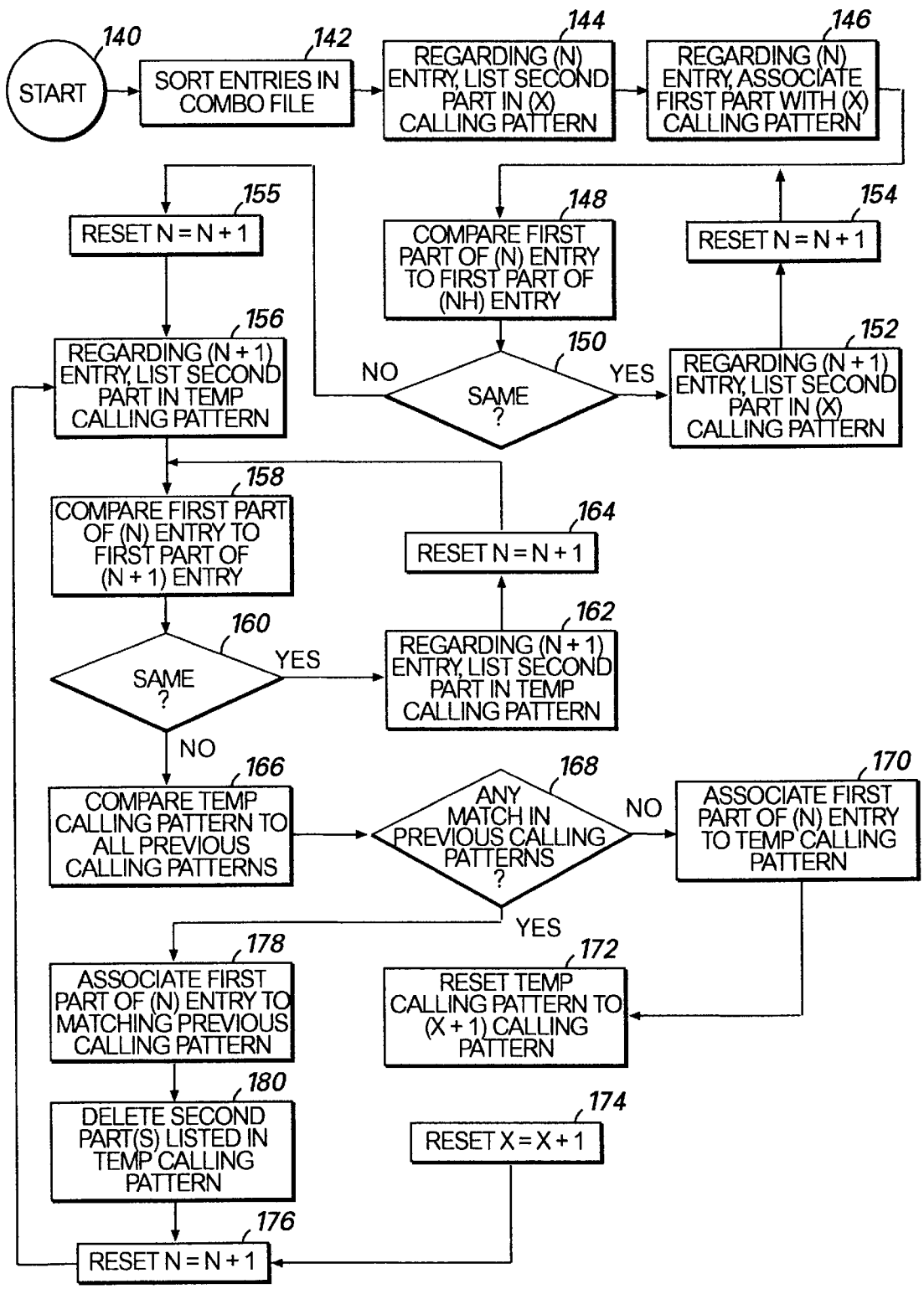
FIG. 5 is a flow diagram illustrating a general method for the construction of a table such as may be used in the construction and implementation of an exemplary embodiment of the present invention.

FIG. 5 illustrates a flow chart of steps that may be followed in the construction of an pattern table such as Table B 130 of FIG. 3. Those skilled in the art will understand that this flow chart is exemplary, that the specific order of these steps is not mandatory but illustrative only, and that other methods and systems may be followed to construct a pattern table pursuant to the present invention.

FIG. 5 is entered at start step 140 and proceeds to step 142 wherein entries such as those entries in a Combo file are preferably numerically sorted based on the first part and second part of each entry. In other words, entries which have common first parts are grouped together. These groups may be arranged in some order such as a hierarchical numbering plan. Preferably, there are no duplicate entries. In step 144, an entry is selected ("N" entry) and the second part of the N entry is listed in a calling pattern (calling pattern "X"). In step 146, the first part of the N entry is associated with calling pattern X. By this association, a search for the first part of the N entry will turn up the association with this calling pattern X. In step 148, the first part of the N entry is compared to the first part of another entry ("N+1" entry). If the check in step 150 results in a determination that the respective first parts of these entries are the same, then in step 152 the second part of the N+1 entry is listed in the calling pattern "X". The method proceeds to step 154, which is a reset step providing that N=N+1. By this reset step, certain steps of FIG. 5 may be repeated as necessary with respect to the other entries of the Combo file or other source of entries. In particular, after step 154, the method returns to step 148 and carries through with the comparison step of 148, check step 150 and listing step 152 until the check step 150 determines that the first part of an entry is different from the first part of another entry. This difference marks a transition from a group of entries based on a particular common first part to another group of entries based on a different common first part. Thus, this difference also marks an end to the listing of second parts of entries in association with calling pattern X.

Referring still to FIG. 5, if the check step 150 determines that the first part of N entry is different from the first part of the N+1 entry, the method proceeds to step 155, which is a reset step providing that N=N+1. By this reset step, certain steps of FIG. 5 may be repeated as necessary with respect to the other entries of the Combo file or other source of entries. Then in step 156 the second part of the N entry is listed in a temporary calling pattern. Then in step 158, the first part of the N entry is compared to the first part of another entry ("N+1" entry). If the check in step 160 results in a determination that the respective first parts of these entries are the same, then in step 162 the second part of the N+1 entry is listed in the temporary calling pattern. The method proceeds to step 164, which is a reset step providing that N=N+1. By this reset step, certain steps of FIG. 5 may be repeated as necessary with respect to the other entries of the Combo file or other source of entries. In particular, after step 164, the method returns to step 158 and carries through with the comparison step of 158, check step 160 and listing step 162 until the check step 160 determines that the first part of an entry is different from the first part of another entry. This difference marks another transition from a group of entries based on a particular common first part to yet another group of entries based on a different common first part. Thus, this difference also marks an end to the listing of second parts of entries in association with a temporary calling pattern. Those skilled in the art will understand that an escape step may be provided as one of the alternatives in check step 160, or at other appropriate steps within the method.

As a result of the end in the listing of second parts of entries in association with a temporary calling pattern, a comparison may be made between the previous compiled calling patterns and the temporary calling pattern. Referring again to FIG. 5, if the check step 160 determines that the first part of N entry is different from the first part of the N+1 entry, then in step 166 a comparison is made between the temporary calling pattern and all previous calling patterns. In particular, the second parts listed in the temporary calling pattern are compared as a group for identity to the second parts listed in each of the previous calling patterns. If the check step 168 results in a negative determination that there is no match between the temporary calling pattern and the previous calling patterns, then the temporary calling pattern is established as a calling pattern different from the previous calling patterns. Thus, after such a negative determination in check step 168, in step 170 the first part of the N entry is associated with the temporary calling pattern. Further, in step 172 the temporary calling pattern is re-na red or reset as the calling pattern X+1. By this association and renaming of the temporary calling pattern, a search for the first part of the N entry will turn up the association with this calling pattern X+1.

After the renaming step 172, the method proceeds to step 174, which is a reset step providing that X=X+1, and then to step 176, which is a reset step providing that N=N+1. Referring again to check step 168, if that check results in a positive determination that there is a match between the temporary calling pattern and any of the previous calling patterns, then in step 178 the first part of the N entry is associated with the matching previous pattern. In step 180, the second part(s) listed in the temporary calling pattern are deleted. The method then proceeds to reset step 176 referenced above. By these reset steps, certain steps of FIG. 5 may be repeated as necessary with respect to the other entries of the Combo file or other source of entries. In particular, after step 176, the method may return to step 156 and carry through with the comparison step of 158, check step 160 and listing step 162 until the check step 160 determines that the first part of an entry is different from the first part of another entry. Then, other previously described steps may be repeated including the compare step 166, check step 168, association step 170 and reset steps of 172, 184 and 176. By the repetition of these steps, the method illustrated in FIG. 5 provides that a temporary calling pattern is created as based upon a comparison among certain entries. The method further provides that this temporary calling pattern then is classified as a calling pattern if the temporary calling pattern is different from all previous calling patterns, or is deleted because the entries in the temporary calling pattern comprise a previous calling pattern.

By way of further illustration, the interested reader is directed to the exemplary tables illustrated in FIG. 4. Application of the steps of FIG. 5 to the entries 122a–122x in the Combo file 120 results in the construction of the patterns 132a–132c of the pattern table 130 also illustrated in FIG. 4.

This pattern table 130 may then be used in an exemplary embodiment of the present invention in response to receipt of a particular NPA-NXX to provide information with respect to the calling pattern or local calling area of that particular NPA-NXX. Preferably, the information that is provided is a pattern corresponding to the particular NPA-NXX. This correspondence may be established by searching each of the patterns of the pattern table for a designation or second part that matches the particular NPA-NXX. This search technique operater on the principal that a particular NPA-NXX may have itself as a terminating NPA-NXX and hence, be a part of its own pattern. See, for example, entries 122a, 122f, 122j and 122l in Table A of FIG. 4.

Description of an LCA Pattern File

A general description of the construction of an LCA pattern file (also referred to as a switch/calling pattern table) is now provided in connection with FIG. 4. After this general description, a more detailed description of the construction of an LCA pattern file is provided in connection with the flow chart of FIG. 6.

Generally stated, pursuant to an exemplary embodiment of the present invention, an LCA pattern file 190 generally correlates the patterns 132a–132c of the pattern table 130 with respect to other device(s). In the preferred embodiment, and pursuant to the example presented in connection with FIG. 4, the LCA pattern file 190 correlates the patterns 132a–132c of the pattern table 130 with respect to telecommunication switches that serve the NPA-NXXs of the entries 122a–122x in the Combo file 120. More particularly stated, the LCA pattern file 190 correlates the patterns 132a–132c of the pattern table 130 with respect to these switches such that a user may obtain information about the switches that serve the terminating NPA-NXXs in a particular calling pattern. The LCA pattern file 190 may be used to provide a listing of one or more switches that serve certain NPA-NXXs that are included as terminating NPA-NXXs in a calling pattern. This listing of one or more switches may be displayed to a user on a computer monitor or graphical user interface. Advantageously, the listing of switches that serve the terminating NPA-NXXs of a particular calling pattern may be useful to sales or marketing personnel.

Still generally stated, the LCA pattern file 190 includes a plurality of LCA patterns. An LCA pattern may be understood to represent a local calling area or calling pattern with respect of one or more directory numbers having a common NPA-NXX or common NPA-NXXs. Each LCA pattern includes a switch entry. Of course, an LCA pattern may include and generally does include more than one switch entry. The LCA pattern file of Table C 190 illustrates a plurality of switch entries including switch entries 192a–192e. As is explained below, these switch entries may be grouped so as to represent a particular LCA pattern with respect to a particular NPA-NXX. An LCA pattern file may be constructed on the basis of a pattern table 130 described above in connection with FIGS. 3 and 4. Nonetheless, those skilled in the art will understand that an LCA pattern file may be constructed in other ways or pursuant to the exemplary embodiment, but based on information or form other than that as provided in the discussion of the pattern table 130.

As illustrated by the column headings 193a–193b of the LCA pattern file 190, each switch entry preferably includes two parts. The first part of a switch entry typically includes a switch identification field or switch identifier 193a that identifies a switch associated with the LCA pattern to which the switch entry belongs. In the preferred embodiment, the switch identifier is a CLLI code. The switch identification field preferably includes information of a predetermined length such as eleven characters. By this predetermined length of field, also referred to as a random field or random organization, all of the switch entries are of a uniform length, which makes these entries much easier to work with and presents other advantages as will be apparent to those skilled in the art.

The second part 193b of a switch entry typically includes or represents at least one directory number that is served by the switch and that is part of the LCA pattern. This representation in the second part of a switch entry may take the form of a wildcard code or a terminating NPA-NXX designation. In the preferred embodiment, this representation in the second part of a switch entry includes seven characters. Thus, a preferred switch entry is eighteen characters plus carriage return and line feed as appropriate.

With respect to the representation in the second part 193b of a switch entry, the wildcard code is more inclusive with respect to NPA-NXXs that are included as part of the LCA pattern while the terminating NPA-NXX designation is less inclusive. When the representation includes a wildcard code, the wildcard code in the switch entry typically indicates that all directory numbers having NPA-NXX portions and that are served by the switch identified by the switch identifier are included as terminating directory numbers in the LCA pattern corresponding to a particular NPA-NXX portion of a directory number. This indication that "all" directory numbers having NPA-NXX portions served by the identified switch earns this form of representation the "wildcard" appellation. For example, refer to switch entry 192a in LCA pattern file 190 which includes a switch identifier of switch A as the first part 194a of the switch entry 192a and which includes a wildcard code 194b as the second part 194b of the switch entry 192a. The wildcard code 194b associated with switch A in the switch entry 192a indicates that all directory numbers served by switch A are part of the LCA pattern corresponding to a directory number having a particular NPA-NXX portion. In the preferred embodiment, this wildcard code or other such indication corresponds to seven asterisks, to-wit: "*******".

On the other hand, as noted, the representation in the second part of a switch entry may include a terminating NPA-NXX designation. The terminating NPA-NXX designation typically represents that only directory numbers having the terminating NPA-NXX designation in common and served by the switch identified by the switch identifier may be dialed as a local call from an originating device associated with an originating directory number having a particular NPA-NXX portion. This indication that "only directory numbers having the terminating NPA-NXX designation in common" served by the identified switch demonstrates that this form of representation is less inclusive than the "wildcard" representation. For example, refer to switch entry 192c in LCA pattern file 190 which includes a switch identifier of switch C as the first part 196a of the switch entry 192c and which includes a terminating NPA-NXX designation 196b as the second part 196b of the switch entry 192c. The terminating NPA-NXX designation 196b associated with switch C in the switch entry 192c indicates that only directory numbers having the terminating NPA-NXX designation in common and served by switch C are part of the LCA pattern corresponding to a directory number having a particular NPA-NXX portion. Generally, a terminating NPA-NXX designation is used in the preferred embodiment of the present invention to handle cases split-offices such as were referenced in the background section of this specification.

The use of wildcard codes and terminating NPA-NXX designations may best be understood through the use of examples as illustrated in connection with the files and tables of FIG. 4. As a first example, the reader is referred to LCA pattern file 190 and to entry 192a wherein switch A is identified. Assume that switch A serves only two NPA-NXXs: 205209 and 205214. Thus, all of the NPA-NXXs that switch A serves are included as terminating NPA-NXXs in the first calling pattern 132a of pattern table 130. It should be noted that switch A does not serve all of the terminating NPA-NXXs of calling pattern 132a as specified in pattern table 130. Switch A does not serve the terminating NPA-NXXs of 205206, 205222, and 318252 which are included as terminating NPA-NXXs in calling pattern 132a. Yet, all of the NPA-NXXs that switch A serves are included as terminating NPA-NXXs in calling pattern 132a. Thus, the second part of the switch entry of entry 192a includes a wildcard code 194b.

As a second example, the reader is referred to entry 192b wherein switch B is identified. Assume that switch B serves three NPA-NXXs: 205206, 205222, and 318252. Thus, all of the NPA-NXXs that switch B serves are included as terminating NPA-NXXs in calling pattern 132a. Thus, the second part of the switch entry 192b includes a wildcard code 195b.

Still referring to these two described entries 192a and 192b of LCA pattern file 190, it should be clear to the reader that these two entries constitute the LCA pattern or listing that would be indexed and/or displayed as a result of a finding that a particular originating NPA-NXX corresponds to the calling pattern 132a. This finding may be based on use of the pattern table 130, on LCA pattern file 190 or based on an independent determination of calling pattern number 132a. For example, assume that a user has provided an input of the originating NPA-NXX of 205206. In response to receiving this input, the preferred method provides information such as, in this example, a listing of the switch entries 192a–192b, which may be provided to the user on a computer monitor or a graphical user interface.

Additional examples are now provided regarding the use of terminating NPA-NXX designations, and reference again is made to LCA pattern file 190. When an identified switch of a switch entry serves only a certain terminating NPA-NXX in the calling pattern corresponding to the switch entry, then the second part of the switch entry includes the identification of this certain terminating NPA-NXX. For example, referring to switch entry 192*c* of the LCA pattern file 190, assume that switch C serves several NPA-NXXs including 205268, but that 205268 is one of only two NPA-NXXs served by switch C in the second calling pattern 132*b* referenced in pattern table 130. To indicate that switch C serves a terminating NPA-NXX (205268) in calling pattern number 132*b*, the second part 196*b* of switch entry 192*c* includes a terminating NPA-NXX designation served by the identified switch in the calling pattern 232*c* of the switch entry 192*c*. Thus, this switch entry 192*c* would read as follows: switch C 205268.

As noted above, the switch preferably is identified by a CLLI code in eleven characters and the second part of the switch entry is filled with seven characters. In this manner, in the preferred embodiment, all of the switch entries in the LCA pattern file 190 have the same number of characters, to-wit: eighteen characters (plus carriage return and line feed, as appropriate). This preference for having the same number of characters in all of the switch entries in the LCA pattern table 190 limits the terminating NPA-NXX designation to a single identification of a terminating NPA-NXX served by an identified switch with respect to the calling pattern of the switch entry. By way of explanation, assume that an identified switch serves more than one terminating NPA-NXX with respect to a calling pattern, but less than all of this identified switch's NPA-NXXs are included in the calling pattern. Then, for each terminating NPA-NXX with respect to a particular calling pattern that is served by this identified switch, a switch entry is provided in the LCA pattern file 190. If a switch serves five terminating NPA-NXXs with respect to a particular calling pattern (and this is less than the total number of NPA-NXXs served by this switch), then the LCA pattern file 190 includes five entries. Each of these entries corresponds to the same calling pattern. Further, with respect to each of these switch entries, the first part of the switch entry identifies the same switch, but the second part identifies a terminating NPA-NXX different from the terminating NPA-NXXs in the other four switch entries.

An example of this type of multiple listing is provided in the illustrated LCA pattern file 190 of FIG. 4. Reference again is made to switch C which serves two NPA-NXXs that are terminating NPA-NXXs in calling pattern 132*b*. Assume that switch C serves more than these two NPA-NXXs. Thus, a wildcard code is inappropriate for use in the second part of the switch entries for switch C. To provide information that switch C serves these two terminating NPA-NXXs in calling pattern number 132*b*, two switch entries 192*c* and 192*d* are provided in the LCA pattern file 190. Switch entry 192*c* includes: switch C/terminating NPA-NXX. Switch entry 192*d* includes: switch C/terminating NPA-NXX'. The "'" indicates that the terminating NPA-NXX in switch entry 192*d* is different from the terminating NPA-NXX in switch entry 192*c*. Note that the switch identifier is the same in both switch entries, but that the terminating NPA-NXXs designations in each entry 192*c*, 192*d* differ. Other ways of including multiple listings of NPA-NXXs also will occur to those skilled in the art.

An alternative use of this LCA pattern file 190 illustrated in FIG. 4 is to provide switch information in response to an inquiry about a particular switch or other field of information in the table. For example, a user may input the CLLI code (or other identification) for switch A. In response, switch information relating to switch A may be provided to the user on a computer monitor or a graphical user interface.

Figure 6:
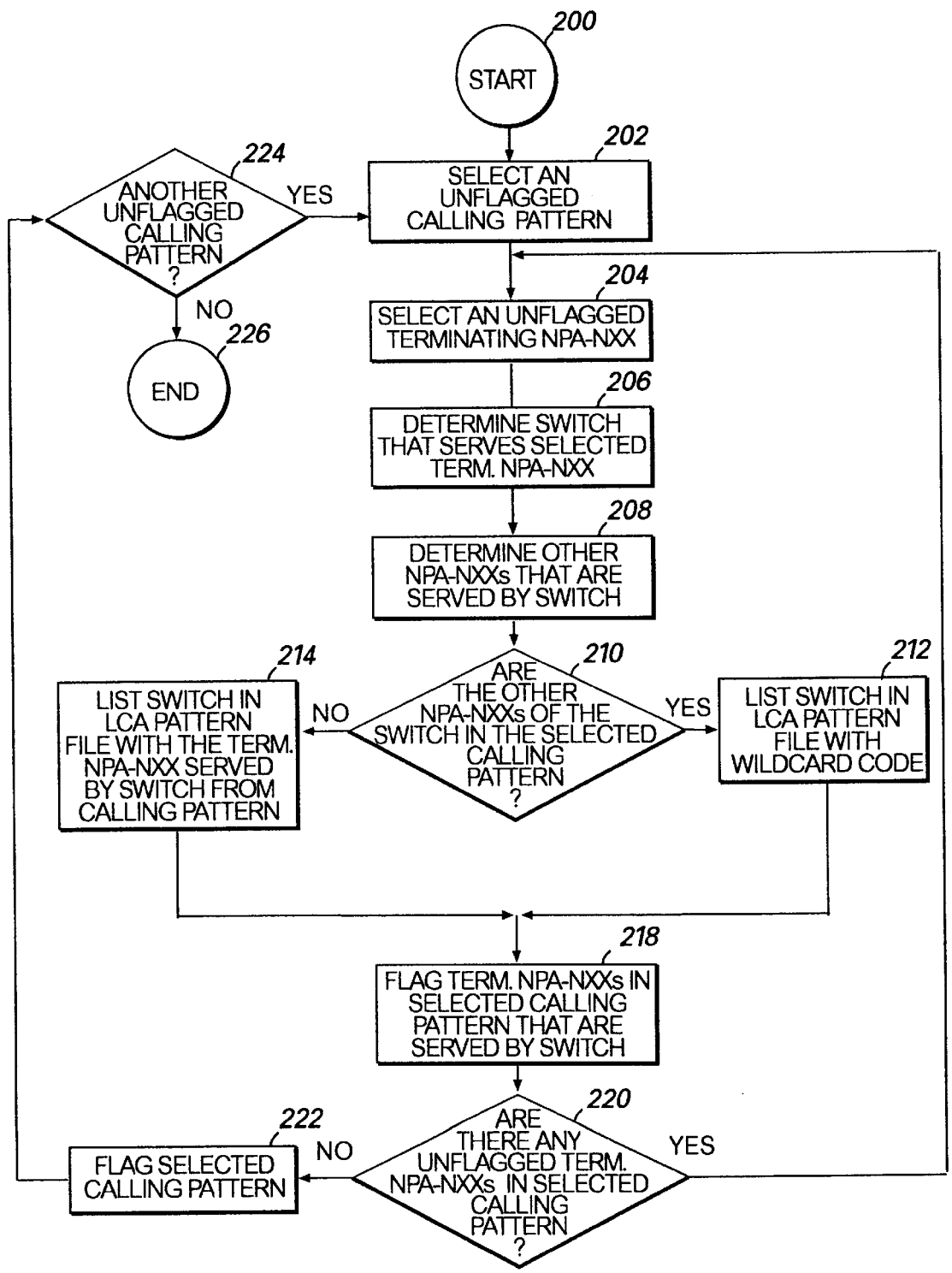
FIG. 6 is a flow diagram illustrating a general method for the construction of a table such as may be used in the construction and implementation of an exemplary embodiment of the present invention.

FIG. 6 illustrates a flow chart of steps that may be followed in the construction of an LCA pattern file. Those skilled in the art will understand that this flow chart is exemplary, that the specific order of these steps is not mandatory but illustrative only, and that other methods and systems may be followed to construct an LCA pattern file pursuant to the present invention.

Generally stated, pursuant to an exemplary embodiment of the present invention, an LCA pattern file is constructed on the basis of a pattern table such as the pattern table 130 illustrated in FIG. 4. To construct an LCA pattern file, after the start step 200 of FIG. 6, in step 202 an unflagged calling pattern is selected preferably from a pattern table. Reference is made herein to an "unflagged" elements to indicate that the unflagged element has not been used as yet as a basis for construction of the LCA pattern file. In contrast, a "flagged" element has been used as a basis for the construction of the file. In the preferred embodiment, all of the calling patterns in an LCA pattern file and all of the terminating NPA-NXXs in a calling pattern are correlated to an LCA pattern file. So the "flagging" of an element is a method to keep track that all such elements are taken into account. Other means for keeping track may be used and will occur to those skilled in the art.

In step 204, FIG. 6, an unflagged terminating NPA-NXX is selected from the selected calling pattern. Then, in step 206 the switch that serves this selected terminating NPA-NXX is identified. With respect to this switch, in step 208 the other NPA-NXXs that are served by this switch are identified. In check step 210, a check is made to determine whether these other NPA-NXXs are terminating NPA-NXXs in the selected calling pattern. If these other NPA-NXXs are terminating NPA-NXXs in the selected calling pattern, then in step 212 this switch is identified in an entry in the LCA pattern file under construction. A wildcard code is included as part of the same entry to indicate that all of the NPA-NXXs served by this switch are present in the selected calling pattern. On the other hand, if these other NPA-NXXs are not terminating NPA-NXXs in the selected calling pattern, then in step 214 this switch is identified in an entry in the LCA pattern file and this entry includes an identification of this selected terminating NPA-NXX in association with this switch. Preferably, the switch entry includes the CLLI code of the switch and this terminating NPA-NXX. After steps 212 and 214, as an optional step (not illustrated) the switch may be associated with the selected calling pattern. Then in step 218 the terminating NPA-NXXs that are served by the identified switch are flagged.

Still referring to FIG. 6, after this flagging of terminating NPA-NXXs in step 218, in step 220 a check is made to determine whether there are any unflagged terminating NPA-NXXs in the selected calling pattern. If there are such unflagged terminating NPA-NXXs, then the preferred method returns to step 204 to repeat the described steps with respect to another selected unflagged NPA-NXX. Preferably, this repetition process repeats until all of the terminating NPA-NXXs in the selected calling pattern have been flagged, i.e., all of the terminating NPA-NXXs have been reviewed. When all of these terminating NPA-NXXs have been flagged, then the check step 220 results in a determination that there are no unflagged terminating NPA-NXXs in the selected calling pattern. After this negative determination to the check step 220, in step 222 the method flags this selected calling pattern. In other words, the method has "finished" with this selected calling pattern and moves on to check step 224 to determine whether there are any unflagged calling patterns left in the pattern table. If there are unflagged calling patterns left in the pattern table, then the preferred method returns to step 202 to repeat the described steps with respect to another selected unflagged calling pattern. Preferably, this repetition process repeats until all of the calling patterns in the pattern table have been flagged, i.e., all of the calling patterns in the pattern table have been reviewed. When all of the calling patterns have been reviewed, then the check step 224 results in a negative determination and the preferred method ends in step 226.

By way of further illustration, the interested reader is directed to the exemplary tables illustrated in FIG. 4. Application of the steps of FIG. 6 to the patterns 132a–132c of the pattern table 130 results in the entries 192a–192e of the LCA pattern file 190 also illustrated in FIG. 4.

Description of another exemplary embodiment of the present invention

Figure 7:
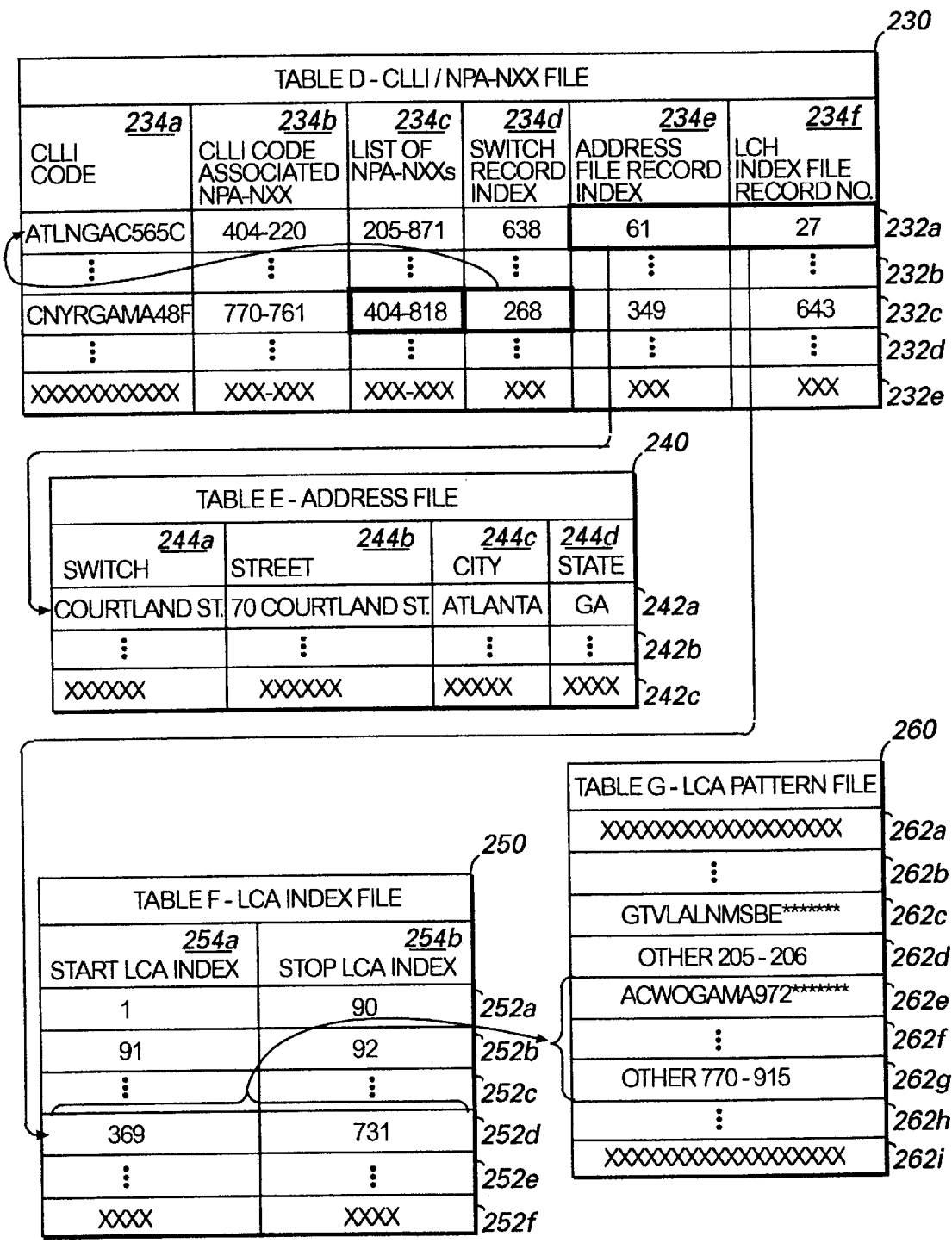
FIG. 7 includes four tables (Tables D, E, F, and G) such as may be used in the construction and implementation of an exemplary embodiment of the present invention.

Another exemplary embodiment of the present invention is now described in the context of an example and by reference to Tables D, E, F and G of FIG. 7. Pursuant to this example, assume that a user is interested in determining the local calling area of an NPA-NXX such as 404-818. This particular NPA-NXX is received by the exemplary embodiment and this embodiment checks a CLLI/NPA-NXX file for this particular NPA-NXX. A CLLI/NPA-NXX file 230 such as may be used in connection with this exemplary embodiment is illustrated as Table D in FIG. 7. Typically, a CLLI/NPA-NXX file includes a plurality of records 232a–232e with each record including six fields of information as follows: CLLI code 234a; CLLI code associated NPA-NXX 234b; listed NPA-NXX 234c; switch record index 234d; address file record index 234e; and LCA index file record number 234f. Of course, this table may include additional information, not described herein. Upon receipt of the particular NPA-NXX, this exemplary embodiment checks the listed NPA-NXX field 234c of each entry 232a–232e in the CLLI/NPA-NXX file 230 for a match to the particular NPA-NXX of 404-818. The listed NPA-NXX field 234c may be considered to be a listing of the NPA-NXXs in the CLLI/NPA-NXX file 230.

Referring to Table D, the search of the CLLI/NPA-NXX file 230 for 404-818 results in a finding of that particular NPA-NXX in the listed NPA-NXX field of record 232c. Upon finding 404-818 in this record 232c, this exemplary embodiment then checks the switch record index field 234d of this record 232c for further information. The switch record index field 234d of this record 232c includes the entry "268" which provides the exemplary embodiment with information that the 268th record of this CLLI/NPA-NXX file 230 be checked for further information. In particular, the 268th record of this CLLI/NPA-NXX file 230 is the first record in a group of records that include information with respect to the switch that serves the particular NPA-NXX of 404-818.

Assume for purposes of the present example, that the 268th record of this CLLI/NPA-NXX file 230 is the record 232a illustrated in Table D as the first record in the CLLI/NPA-NXX file 23. Thus, this record 232a includes information with respect to the switch that serves the particular NPA-NXX of 404-818. This switch information may be gleaned from the fields of this record 232a such as the switch's CLLI code (ATLNGASC565C), CLLI code associated NPA-NXX, address file record index (61) and LCA index file record number (27). For additional information, this exemplary embodiment uses the information in the field referred to as the address file record index which is "61" to access the 61st entry in a table referred to herein as an address file 240 and illustrated as Table E in FIG. 7. Preferably, the address file 240 includes a plurality of entries 242a–242c. Each entry may include four fields of information as follows: switch name 244e; street address 244b; city 244c; and state 244d. In particular, the 61st entry of this address file 240 is the first entry 242a in the address file 240. From this 61st entry, this exemplary embodiment obtains the following information about the switch that serves the particular NPA-NXX of 404-828: name—Courtland Street; street address—70 Courtland Street; city—Atlanta; and state—Georgia. This information may be displayed to the user on a computer monitor and/or a graphical user interface for review by a user. For example, this information about the switch serving the particular NPA-NXX of 404-808 may be presented on a screen display such as Display A as illustrated in FIG. 3 and referenced above.

To continue our example, assume that the user has a continuing interested in determining the local calling area of the particular NPA-NXX of 404-818. The user may have indicated this continuing interested by the activation of a hot button such as the hot button 115 labeled "LCA Info" on a Display A 112 such as illustrated in FIG. 3. To obtain such local calling information, this exemplary embodiment uses the information provided by the CLLI/NPA-NXX file 230. In particular, this exemplary embodiment uses the information provided in the field referred to as the LCA index file record number. This field includes an entry of "27" which instructs the exemplary embodiment to access the 27th entry in a table referred to herein as an LCA index file 250 and illustrated as Table F in FIG. 7.

Preferably, the LCA index file 250 includes a plurality of records 252a–252f. Each record may include two fields as follows: a start LCA index 254a and a stop LCA index 254b. These start and stop indices provide this exemplary embodiment with information as to the beginning switch entry and ending switch entry in a listing or group of switch entries in an LCA pattern file where the listing or group of switch entries corresponds to the calling pattern or local calling area of the particular NPA-NXX of 404-818. Referring again to Table F—LCA index file 250, assume that the 27th record of this file is record 252d illustrated in Table F as the fourth record in the LCA index file 150. Thus, this record 252d includes the information that the start LCA index for the calling pattern corresponding to the particular NPA-NXX of 404-818 is "369". Further, this record 252d includes the information that the stop LCA index for the calling pattern corresponding to the particular NPA-NXX of 404-818 is "731".

To obtain the information including the local calling area corresponding to the particular NPA-NXX of 404-818, this exemplary embodiment uses these start and stop indices of 369 and 731 in conjunction with an LCA pattern file 260 such as Table G illustrated in FIG. 7. The careful reader will note that the LCA pattern file—Table G in FIG. 7 is of the same form as the LCA pattern file—Table C described in connection with FIG. 4. In particular, the LCA pattern file—Table G in FIG. 7 includes a plurality of switch entries 262a–262i with each switch entry having a switch identifier and a second part consisting of either a wildcard code or a terminating NPA-NXX designation. For example, switch entry 262c includes a switch identifier of GTVALNM58E and a wildcard code comprising seven asterisks (*******). Switch entry 262d includes a switch identifier of "other". In this exemplary embodiment, this "other" identifies the switch as a switch of another service provider rather than a switch of the telecommunications network operated by the service provider which constructed and maintained the LCA pattern file 260. This switch entry 262d includes a terminating NPA-NXX designation of "205-206" as its second part.

As noted above, the exemplary embodiment of this example uses the start and stop indices of 369 and 731 from the LCA index file 250 in conjunction with the LCA pattern file 260. In particular, this exemplary embodiment obtains the 369th through 731st switch entries from the LCA pattern file 260. These switch entries (369th through 731st entries) comprise the local calling area of the particular NPA-NXX of 404-818. Assume for this example that switch entry 262e (ACWOGAMA97E*****) is the 369th switch entry in LCA pattern file 260 and that switch entry 262g (other 770-915) is the 731st switch entry for LCA pattern file 260. This exemplary embodiment displays these switch entries (ACWOGAMA97E*****—other 770-915) on a computer monitor and/or a graphical user interface for review by a user. For example, these switch entries may be presented on a screen display such as Display B as illustrated in FIG. 3 and referenced above. Of course, a single screen display may be unable to present all of these entries and a user may have to scroll through or otherwise bring up the other information as appropriate.

Advantageously, this exemplary embodiment of the present invention quickly, efficiently and accurately provides information with respect to the classification of a directory number or portion thereof as associated with other directory numbers or portions thereof. This classification may include information with respect to the local calling area or calling pattern of a particular NPA-NXX. This information may be very useful in many fields associated with telecommunications including sales and service.

This invention has been described in detail with particular reference to exemplary and preferred embodiments thereof. It will be understood that variations and modifications can be effected within the spirit and scope of the invention as described hereinabove and as defined in the appended claims.

I claim:

1. A method for determining what directory number may be dialed as a local call from an originating device associated with a directory number having a particular NPA-NXX portion, comprising the steps of:
   A. providing a local calling area (LCA) pattern file comprising a plurality of LCA patterns,
      wherein each LCA pattern of said plurality of LCA patterns comprises a switch entry, and
      wherein said switch entry comprises
         a switch identifier identifying a switch, and either a wildcard code or a terminating NPA-NXX designation,
      wherein said wildcard code in said switch entry indicates that all directory numbers having NPA-NXX portions served by said switch identified by said switch identifier are included as terminating directory numbers in said LCA pattern corresponding to said particular NPA-NXX portion, and
      wherein said terminating NPA-NXX designation represents a terminating directory number associated with a terminating device that may be dialed as a local call from an originating device associated with an originating directory number having a particular NPA-NXX portion;
   B. receiving said particular NPA-NXX portion;
   C. checking said LCA pattern file for the LCA pattern corresponding to said particular NPA-NXX portion; and
   D. providing information with respect to said LCA pattern corresponding to said particular NPA-NXX portion, said information comprising at least one switch entry, said at least one switch entry having said switch identifier and either said wildcard code or said terminating NPA-NXX designation, whereby a determination may be made from said information as to what other directory number may be dialed as said local call from said originating device associated with said directory number having said particular NPA-NXX portion.

2. The method of claim 1, wherein said LCA pattern corresponding to said particular NPA-NXX portion represents the local calling area for said particular NPA-NXX portion; and
   wherein said step D of providing said information with respect to said LCA pattern corresponding to said particular NPA-NXX portion further comprises providing said information with respect to said local calling area for said particular NPA-NXX portion.

3. The method of claim 1, wherein said LCA pattern corresponding to said particular NPA-NXX portion includes a plurality of switch entries, and
   wherein said step D of providing said information further comprises providing said plurality of switch entries.

4. A method for determining whether a directory number is classified as associated with other directory numbers, comprising the steps of:
   A. providing a local calling area (LCA) pattern file comprising a plurality of LCA patterns,
      wherein each LCA pattern of said plurality of LCA patterns comprises a switch entry,
      wherein said switch entry comprises a first part and a second part,
      wherein said first part includes a switch identifier identifying a switch, and
      wherein said second part represents at least one directory number that is served by said switch and that is part of said each LCA pattern;
   B. receiving a particular directory number;
   C. checking said LCA pattern file for the LCA pattern corresponding to said particular directory number; and
   D. providing information with respect to said LCA pattern corresponding to said particular directory number, said information comprising at least one switch entry having said first part including said switch identifier and having said second part, whereby a determination may be made from said information as to whether said directory number is classified as associated with other directory numbers.

5. The method of claim 4, wherein said LCA pattern corresponding to said particular directory number represents the local calling area for said particular directory number; and
   wherein said step D of providing said information with respect to said LCA pattern corresponding to said particular directory number further comprises providing said information with respect to said local calling area for said particular directory number.

6. The method of claim 4, wherein said LCA pattern corresponding to said particular directory number includes a plurality of switch entries, and
   wherein said step D of providing said information further comprises providing said plurality of switch entries.

7. A computer-readable medium on which is stored a computer program for determining what directory number may be dialed as a local call from an originating device associated with a directory number having a particular NPA-NXX portion, said computer program comprising instructions, which when executed by a computer, perform the steps of:

A. providing a local calling area (LCA) pattern file comprising a plurality of LCA patterns,
        wherein each LCA pattern of said plurality of LCA patterns comprises a switch entry, and
        wherein said switch entry comprises
            a switch identifier identifying a switch, and either a wildcard code or a terminating NPA-NXX designation,
        wherein said wildcard code in said switch entry indicates that all directory numbers having NPA-NXX portions served by said switch identified by said switch identifier are included as terminating directory numbers in said LCA pattern corresponding to said particular NPA-NXX portion, and
        wherein said terminating NPA-NXX designation represents a part of a terminating directory number associated with a terminating device that may be dialed as a local call from an originating device associated with an originating directory number having a particular NPA-NXX portion;
    B. receiving said particular NPA-NXX portion;
    C. checking said LCA pattern file for the LCA pattern corresponding to said particular NPA-NXX portion; and
    D. providing information with respect to said LCA pattern corresponding to said particular NPA-NXX portion, said information comprising at least one switch entry, said at least one switch entry having said switch identifier and either said wildcard code or said terminating NPA-NXX designation.

8. A computer-readable medium on which is stored a computer program for determining whether a directory number is classified as associated with other directory numbers, said computer program comprising instructions, which when executed by a computer, perform the steps of:

A. providing a local calling area (LCA) pattern file comprising a plurality of LCA patterns,
        wherein each LCA pattern of said plurality of LCA patterns comprises a switch entry,
        wherein said switch entry comprises a first part and a second part,
        wherein said first part includes a switch identifier identifying a switch, and
        wherein said second part represents at least one directory number that is served by said switch and that is part of said each LCA pattern;
    B. receiving a particular directory number;
    C. checking said LCA pattern file for the LCA pattern corresponding to said particular directory number; and
    D providing information with respect to said LCA pattern corresponding to said particular directory number, said information comprising at least one switch entry having said first part including said switch identifier and said second part.

9. A method for determining what directory number may be dialed as a local call from an originating device associated with an originating directory number having a particular NPA-NXX portion, comprising the steps of:

A. providing a pattern table comprising a plurality of patterns,
        wherein each pattern of said plurality of patterns comprises a plurality of terminating NPA-NXX designations, and
        wherein each terminating NPA-NXX designation of said plurality of terminating NPA-NXX designations represents a directory number associated with a terminating device that may be dialed as a local call from an originating device having a local calling area pattern corresponding to said each pattern;
    B. receiving said particular NPA-NXX portion;
    C. checking said pattern table for the pattern corresponding to said particular NPA-NXX portion; and
    D. providing information with respect to said pattern corresponding to said particular NPA-NXX portion, said information comprising at least one of said plurality of terminating NPA-NXX designations, whereby a determination may be made from said information as to what other directory number may be dialed as said local call from said originating device associated with said originating directory number having said particular NPA-NXX portion.

* * * * *